Patented Apr. 16, 1940

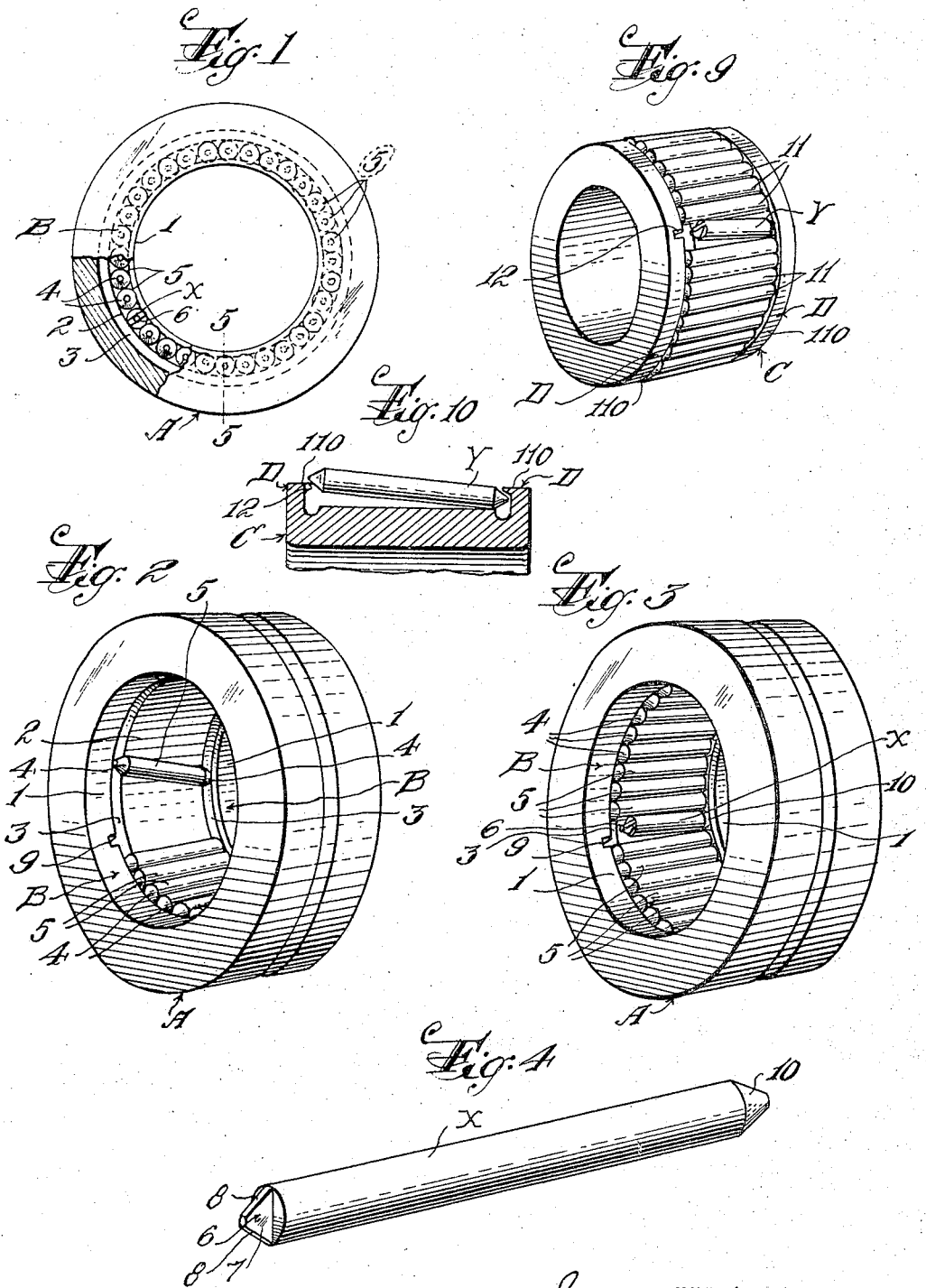

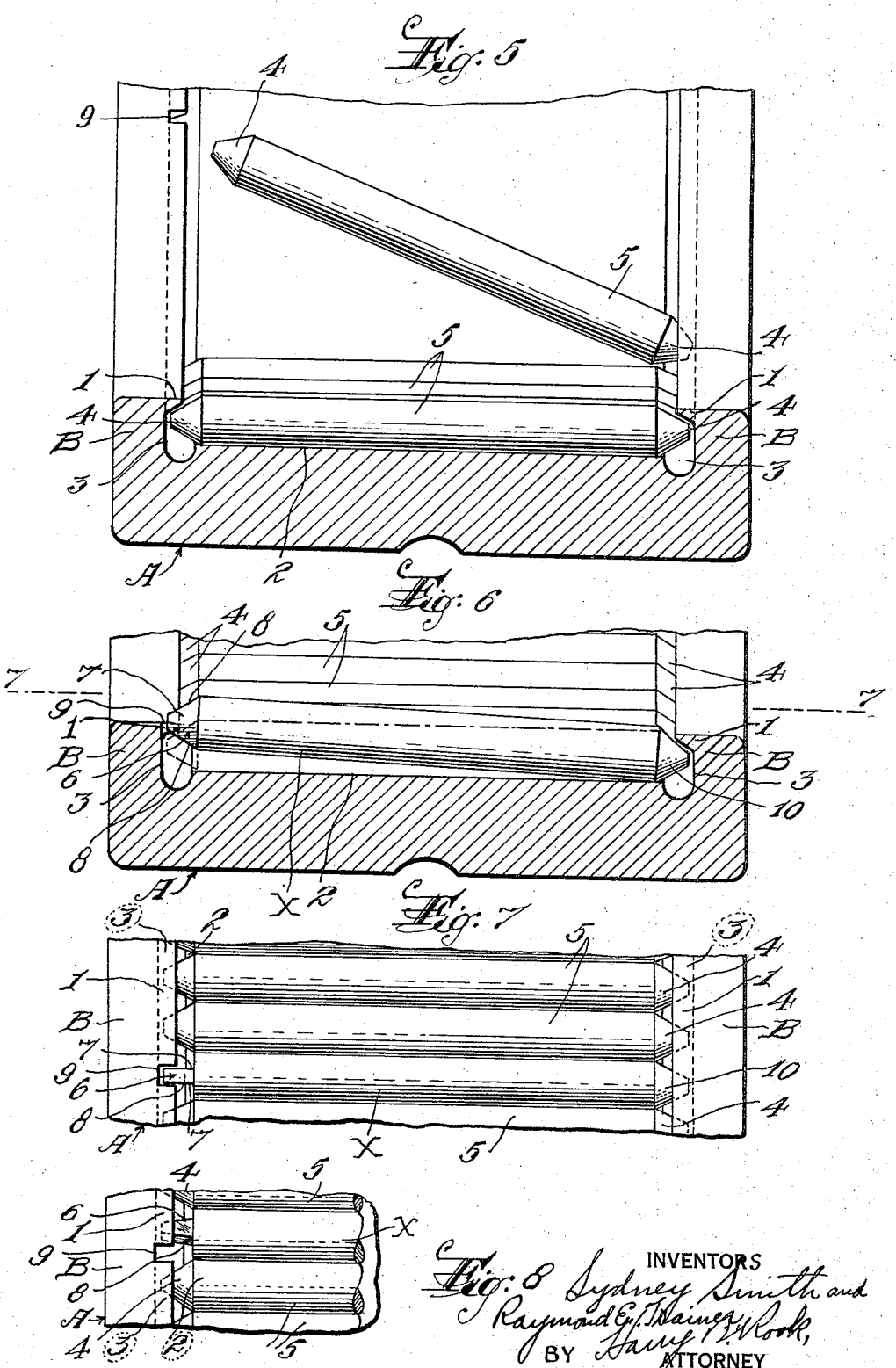

2,197,351

UNITED STATES PATENT OFFICE 2,197,351

ROLLER BEARING

Sydney Smith, Trenton, N. J., and Raymond E. Trainer, Cynwyd, Pa., assignors to Roller Bearing Company of America, Trenton, N. J., a corporation of New Jersey Application February 10, 1939, Serial No. 255,572

5 Claims. (Cl. 308—213)

This invention relates to roller bearings of the type including a race ring having roller retainers at its ends, and a plurality of rollers to roll in said race ring and held against both sidewise and lateral displacement therefrom.

More particularly, the invention is directed to the insertion of rollers into bearings wherein the roller retainers are integral with the race ring, although the invention also may be utilized in bearings having separate roller retainers fastened on the race ring, for inserting rollers after the retainers have been secured to the race ring.

In such roller bearings, the roller retainers extend throughout the circumference of the race ring coaxially therewith and have interior circumferential grooves, or inwardly directed circumferential flanges in opposed relation to the raceway, while the ends of the rollers have trunnions, or conical or reduced ends, loosely disposed in said grooves or beneath said flanges so that the rollers are held against both axial and lateral displacement relative to the race ring.

One object of this invention is to provide a novel and improved, simple and inexpensive construction for roller bearings of the general character described whereby the rollers can be inserted or assembled in the race ring easily and quickly.

Another object is to provide such a roller bearing including a race ring and a set or complement of rollers so constructed that the majority or all but one of the rollers can be easily and quickly inserted into the race ring between said retainers by simple canting or manipulation of the rollers relative to the race ring, while at least one roller serves as a "key roller" and is specially constructed to cooperate with a specially formed portion of the race ring to permit insertion of the key roller after insertion of the other rollers and to hold all of the rollers against displacement from the race ring.

A further object is to provide a novel and improved method of assembling rollers in race rings of bearings of the general character described, whereby the assembling operation shall be simple, rapid and inexpensive.

Other objects, advantages and results of the invention will appear from the following description when read in conjunction with the accompanying drawings in which:

Figure 1 is an end elevational view of an outer race-ring for a roller bearing embodying my invention, with portions broken away for clearness in illustration.

Figure 2 is a perspective view of the race-ring showing the manner of inserting the majority of the rollers in the race-ring.

Figure 3 is a similar view showing the manner of inserting the "key roller" into the race-ring.

Figure 4 is a detached perspective view of the key roller shown on an enlarged scale.

Figure 5 is an enlarged longitudinal vertical sectional view through the race-ring on the line 5—5 of Figure 1 showing the manner of inserting the majority of the rollers.

Figure 6 is a similar view showing the manner of inserting the key roller.

Figure 7 is a fragmentary plan view taken on the line 7—7 of Figure 6.

Figure 8 is a similar view showing the key roller completely inserted into the race-ring.

Figure 9 is a view similar to Figure 2 depicting an inner race-ring, showing the insertion of the key roller, and Figure 10 is a view similar to Figure 6 of the structure illustrated in Figure 9.

Referring to Figures 1 to 8 inclusive, the reference characters A and B designate respectively the race-ring and the roller retainers. As shown, these roller retainers constitute coaxial flanges integral with the race-ring at opposite ends thereof, although if desired the retainers may be in the form of separate rings secured to the ends of the race-ring, for example as shown in the co-pending application of Victor L. Barr, Serial No. 209,207, filed May 21, 1938. Each retainer has an inwardly extending circumferential flange or lip 1 disposed in spaced opposed relation to the inner surface or raceway 2 of the race-ring to form an interior circumferential groove 3 which loosely receives the reduced frusto-conical ends or trunnions 4 of the plurality or complement of rollers 5.

In accordance with the invention, all of the rollers 5 except one are insertible into the race-ring with their ends 4 disposed beneath the lips 1 of the retainers, by simple manipulation or canting of the rollers relative to the race-ring. Specifically, as shown in Figures 2 and 5, each roller is initially canted with its axis at an angle to an axial plane of the race-ring, whereupon the ends or trunnions 4 of the roller are inserted beneath the lips of the retainers B, after which the roller is set with its axis approximately in an axial plane of the race-ring.

As shown, one of the rollers designated X has at least one end specially formed to cooperate with a specially formed portion of one of the retainers B so that said roller can be inserted into the race-ring with the roller axis disposed approximately in an axial plane of the race-ring and after all of the other rollers have been inserted as hereinbefore described. Specifically, the reduced end of the roller X is in the form of a diametral fin 6 having two opposite flat sides 7 and two opposite edges 8 converging at an angle corresponding to the sides of the frusto-conical ends 4 of the other rollers, and one retainer ring B has a radial slot 9 opening through the inner periphery of the lip 1 and leading into the corresponding groove 3, said slot being of a width slightly greater than the thickness of the fin 6 and of a depth approximately corresponding to the depth of the groove 3. With this construction, when the roller X is disposed with one axial plane thereof in an axial plane of the race-ring coincident with the axial plane in which the notch 9 lies, and with the fin 6 disposed edgewise to the slot 9, upon lateral movement of the roller in said axial plane, the fin may be slipped through the slot as shown in Figures 3, 6 and 7 with the other end 10 of the roller disposed beneath the lip 1, of the opposite retainer B. Thereafter, the rollers are rolled along the raceway 2 of the race-ring so that the fin 6 is disposed obliquely or crosswise with respect to the slot 9 as shown in Figure 8, so that the fin 6 will be held against movement through the slot upon lateral movement of the roller X in its axial plane that is then coincident with the axial plane of the race-ring in which the slot 9 is disposed. When all of the rollers are inserted, they mutually hold each other with their axes approximately parallel to the axis of the race-ring, and the lips 1 cooperating with the ends 4, 6 and 10 of the respective rollers, hold the rollers against both axial and lateral displacement from the race-ring. Consequently, the roller X constitutes a key roller and controls the removal of the other rollers. For example, upon removal of the key roller by withdrawing the fin 6 outwardly through the slot 9, the other rollers may then be moved from the race-ring by canting them as shown in Figure 5.

It will be observed that the key roller can be inserted into and removed from the race-ring only when the fin 6 is in a certain relation to the slot 9, and the fin 6 being wider than the slot, the possibility of the fin 6 accidentally accurately aligning with the slot 9 as shown in Figures 5 and 6, is so remote as to be inconsequential.

It will be understood by those skilled in the art that two or more of the rollers may be formed in the same way as the key roller X, and either or both of the retainers B may have one or more slots 9 or equivalents thereof.

The invention is equally adaptable to inner race-rings as shown in Figures 9 and 10. Here the race-ring C has outwardly extending retainers D which have inturned lips 110 corresponding to the lips 1, and at least one of the rollers Y is formed in a manner corresponding to the key roller X, while the other rollers 11 may be identical in structure with the rollers 5. Either or both of the retainers D may have one or more slots 12 corresponding to the slot 9. The rollers 11 and the key roller Y are inserted into the race-ring in the same manner as hereinbefore described in connection with the outer race-ring illustrated in Figures 1 to 8 inclusive.

While we have shown and described the invention as embodied in certain now preferred details of structure, it should be understood that this is primarily for illustrating the principles of the invention, and that many modifications and changes may be made in the details of structure, particularly the special form of the key rollers and cooperating portions of the retainers, without departing from the spirit or scope of the invention.

Having thus described our invention, what we claim is:

1. A roller bearing comprising a race-ring having coaxial roller retainers with inwardly facing circumferential grooves, a plurality of rollers each having reduced ends loosely fitted in said grooves to permit rolling of said rollers circumferentially of said race-ring and hold the rollers against displacement relative to said race-ring, one reduced end of at least one of said rollers being in the form of a diametral fin, and at least one of said roller retainers having a radial slot of a width slightly greater than the thickness of said fin and leading into the corresponding groove to permit said fin to slip edgewise through the slot into said groove for inserting said roller into the race-ring with its ends in said grooves of the roller retainers, said fin being of a width greater than said slot to hold said roller against displacement through said slot when the fin is disposed other than edgewise to the slot.

2. A roller bearing comprising a race-ring having coaxial roller retainers with inwardly facing circumferential grooves, a plurality of rollers certain of which have frusto-conical ends loosely fitted in said grooves to permit rolling of said rollers circumferentially of the race-ring and hold the rollers against displacement relative to said race-ring, one end of at least one roller having a diametral fin formed with two approximately flat opposite sides and two edges converging at an angle corresponding to the sides of said frusto-conical ends of the other rollers, and at least one of said roller retainers having a radial slot of a width slightly greater than the thickness of said fin and leading into the corresponding groove to permit said fin to slip edgewise through the slot into said groove for inserting said roller into the race-ring with its ends in said grooves of the roller retainers.

3. A roller bearing comprising a race-ring having coaxial roller retainers with inwardly facing circumferential coaxial grooves, a plurality of rollers having reduced ends loosely fitted in said grooves to permit rolling of said rollers circumferentially of the race-ring and hold the rollers against displacement from the race-ring, at least one of said roller retainers having a slot opening through its periphery and leading into the corresponding said groove, said slot being of a width less than the diameter of said rollers, and at least one end of at least one roller having a diametral fin of a thickness and width slightly less and greater respectively than the width of said slot.

4. A roller bearing comprising a race-ring having coaxial roller retainers with inwardly facing circumferential grooves, a plurality of rollers each having reduced ends loosely fitted in said grooves with their axes parallel to the axis of said race-ring to permit rolling of said rollers circumferentially of said race-ring and hold the rollers against displacement relative to said race-ring, said rollers mutually holding each other with their axes approximately in axial planes of said race-ring when all of the rollers are inserted, and at least one end of at least one roller and at least one roller retainer having specially formed cooperating portions to permit the said end of said roller to enter the corresponding groove of said roller retainer when the roller is moved laterally in one axial plane thereof that is coincident with an axial plane of the race-ring, and to hold the roller against movement out of said groove when the roller is rotated to bring another axial plane thereof into coincidence with said axial plane of the race-ring.

5. A roller bearing comprising a race-ring having coaxial roller retainers with inwardly facing circumferential coaxial grooves, a plurality of rollers having reduced ends loosely fitted in said grooves to permit rolling of said rollers circumferentially of the race-ring and hold the rollers against displacement from the race-ring, one of said rollers constituting a key roller to control removal of the other rollers from the race-ring, at least one roller retainer having a slot opening through its periphery and leading into the corresponding groove, and one end of said key roller being shaped to pass freely into said slot when the roller is moved laterally in one axial plane thereof that is coincident with an axial plane of the race-ring, and to hold the roller against movement out of said slot when the roller is rotated to bring another axial plane thereof into coincidence with said axial plane of the race-ring.

SYDNEY SMITH.
RAYMOND E. TRAINER.